US006706172B2

United States Patent
Strawser, Sr.

(10) Patent No.: US 6,706,172 B2
(45) Date of Patent: Mar. 16, 2004

(54) STORMWATER FILTER ASSEMBLY FOR CATCH BASIN GRATES

(76) Inventor: Daniel M. Strawser, Sr., 6944 State Rte. 605, New Albany, OH (US) 43054

( * ) Notice: Subject to any disclaimer, the term of this patent is extended or adjusted under 35 U.S.C. 154(b) by 52 days.

(21) Appl. No.: 10/152,464

(22) Filed: May 21, 2002

(65) Prior Publication Data

US 2003/0217955 A1 Nov. 27, 2003

(51) Int. Cl.7 .................................................. E03F 5/06
(52) U.S. Cl. ........................ 210/164; 210/474; 210/489; 210/499; 404/4
(58) Field of Search ............................... 210/163, 164, 210/170, 474, 489, 499; 404/4, 5

(56) References Cited

U.S. PATENT DOCUMENTS

| 4,658,449 A | * | 4/1987 | Martin | 210/163 |
| 4,728,422 A | * | 3/1988 | Bailey | 210/489 |
| 5,076,924 A | * | 12/1991 | Persson et al. | 210/474 |
| 5,733,445 A | * | 3/1998 | Fanelli | 404/4 |
| 5,954,952 A | * | 9/1999 | Strawser, Sr. | 210/165 |
| 6,010,622 A | * | 1/2000 | Chinn et al. | 210/164 |
| 6,463,700 B2 | * | 10/2002 | Davis | 210/499 |
| 2002/0130083 A1 | * | 9/2002 | Middleton et al. | 210/163 |

* cited by examiner

Primary Examiner—Christopher Upton
(74) Attorney, Agent, or Firm—Thomas S. Baker, Jr.

(57) ABSTRACT

The present is basically comprised of a piece of polypropylene woven mesh cut to the size of the catch basin inlet opening grate, of a heavy-duty, partially-resilient rubber open frame member superimposed upon the woven mesh with peripheral butyl rubber adhesive strips, of peripheral butyl rubber adhesive strips secured to the underside of the woven mesh, and preferably a readily removable backing strip contacting the underside peripheral butyl rubber adhesive strip to avoid temporary and inadvertent adhering of the assembly in unwanted places.

4 Claims, 1 Drawing Sheet

STORMWATER FILTER ASSEMBLY FOR CATCH BASIN GRATES

CROSS-REFERENCES

None

FIELD OF THE INVENTION

This invention relates generally to the ecologically sound management of earthwork construction projects, and particularly concerns an improved filter assembly that may be easily superimposed upon, or replaced, over the inlet grate of a conventional storm water catch basin to filter earth sediments and other debris from storm water passing through the catch basin grate as during rainstorms and the like.

BACKGROUND OF THE INVENTION

It is common practice in the United States in order to meet governmental regulation requirements for the filtering of sediments from storm waters entering the conventional catch basins of typical underground storm water disposal systems to encase each system catch basin inlet grate in an envelope of mesh fabric—sometimes commonly referred to as a "Dandy Bag". Such "Dandy Bags" are difficult to install, are difficult to clean, and most importantly are easily damaged by the wheels of construction trucks passing over the mesh-encased catch basin inlet grate to the point of early filter destruction and unsalability.

I have discovered a construction for a catch basin inlet grate filter that overcomes the difficulties associated with the known catch basin grate filters, that is inexpensive to manufacture, has long service life, and that is particularly easy to install and replace.

Other objects and advantages of the present invention will become apparent during a consideration of the detailed descriptions, drawings, claims, and abstract which follow.

SUMMARY OF THE INVENTION

The present invention is basically comprised of a piece of polypropylene woven mesh cut to the size of the catch basin inlet opening grate, of a heavy-duty, partially-resilient rubber open frame member superimposed upon the woven mesh with peripheral butyl rubber adhesive strips, of peripheral butyl rubber adhesive strips secured to the underside of the woven mesh, and preferably a readily removable backing strip contacting the underside peripheral butyl rubber adhesive strip to avoid temporary and inadvertent adhering of the assembly in unwanted places.

DETAILED DESCRIPTION

Figure 1:
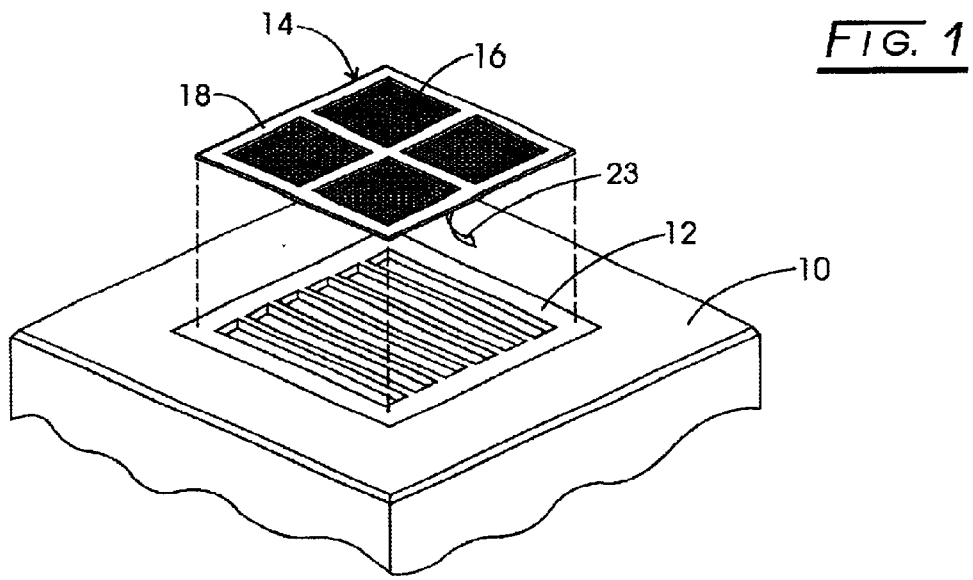
FIG. 1 is a perspective view of the storm water filter assembly of the present invention being installed on the inlet grate of a conventional storm water catch basin.

In FIG. 1 of the drawing I illustrate a conventional concrete catch basin structure 10 having a metal inlet grate insert 12; the catch basin is normally a part of an underground storm water removal system and the grate functions as an inlet to that system for storm water. When located in or near new construction projects involving the displacement or removal of soil, such catch basins are prone to receive loose soil and other debris and such can lead to eventual clogging of the system. Thus it is important to provide a grate filter for preventing such materials from passing through the grate and into the underground system.

Figure 2:
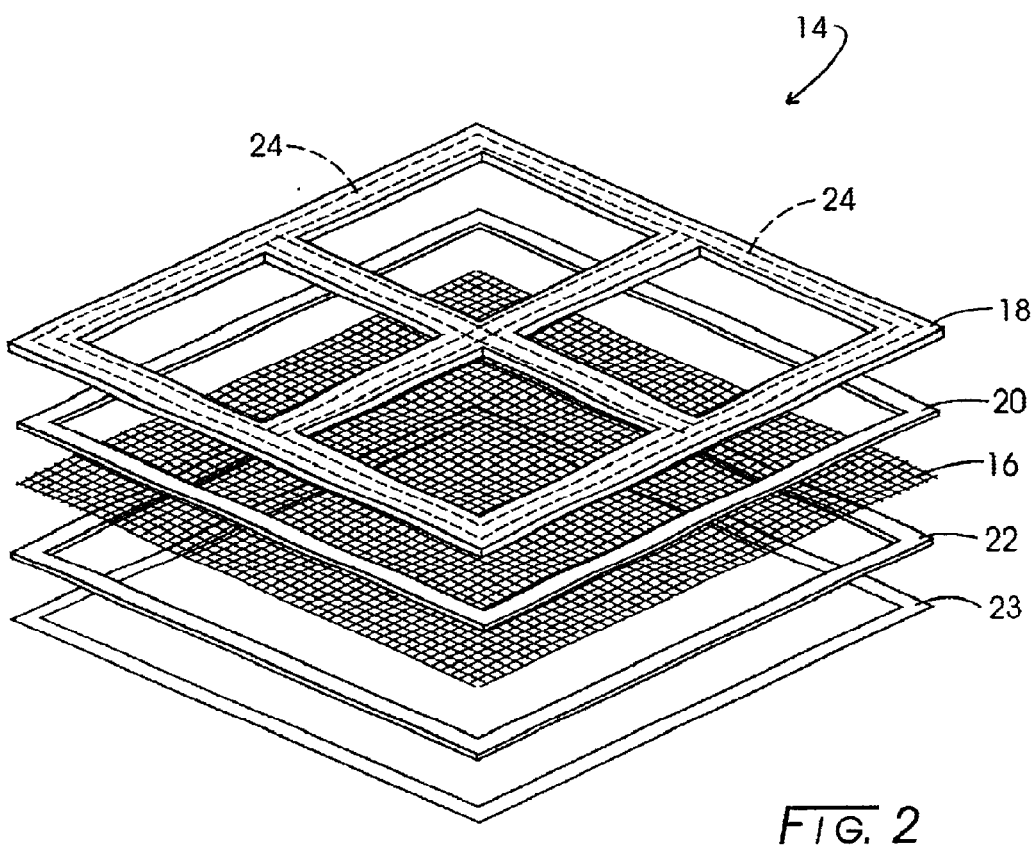
FIG. 2 is an exploded view of the storm water filter assembly of FIG. 1.

Structure 10 is provided with a superimposed preferred embodiment of the filter assembly 14 of the present invention which is basically comprised of a rather finely woven mesh fabric screen 16 which may be polypropylene or any material having similar properties cut to the plan size of grate insert 12 (nominally 24" by 24"), of a rather stiff yet pliable frame overlay 18 made of a fabric-reinforced rubber (typically 3/16 of an inch thick), and of multiple strips 20 of an adhesive which may be butyl rubber or any other water and temperature resistant adhesive securing the peripheral edges of the screen 16 to the underside surface of frame overlay 18. Multiple strips 22 of an adhesive which may be butyl rubber or any other water and temperature resistant adhesive is secured to the underside surface of mesh fabric screen 16. See FIG. 2. The butyl rubber adhesive strips 20 and 22 are typically 3/8 inch wide by 1/8 inch thick. In addition I prefer to provide adhesive strips 22 with a readily removable and disposable paper backing strip 23 which eliminates or at least minimizes the inadvertent sticking of filter assembly 14 in unwanted positions or places due to careless handling during the installation process.

Also, I prefer to incorporate or provide integral reinforcement strips 24 into the rubber frame overlay element 18 of the invention.

Installation of assembly 14 on grate element 12 is a simple procedure requiring only that the grate be cleaned and dried of loose soil, debris, etc., that the removable backing strips 23 secured to the underside of mesh fabric screen 16 are removed and the screen put in its proper place. See FIG. 1.

Various changes may be made to the relative sizes, shapes, and materials of construction described herein without departing from the scope, meaning, or intent of the claims which follow.

I claim as my invention:

1. A stormwater filter assembly for application to a catch basin inlet opening grate, and comprising:
   a woven mesh element cut to the size of the catch basin inlet opening grate;
   a heavy-duty, partially-resilient rubber compound open frame member cut to the size of and superimposed upon and affixed to said woven mesh element with adhesive strips; and
   peripheral adhesive strips secured to the underside of said woven mesh element.

2. The stormwater filter assembly defined by claim 1, further comprising a readily removable backing strip contacting the underside peripheral adhesive strips to avoid temporary and inadvertent adhering of the assembly in unwanted places.

3. The stormwater filter assembly defined by claim 1, and wherein said heavy-duty, partially-resilient rubber compound open frame member is provided with integral internally located reinforcement strips of the same heavy-duty, partially-resilient rubber compound.

4. The stormwater filter assembly defined by claim 1, wherein said peripheral adhesive strips are butyl rubber.

* * * * *